(12) United States Patent
MacGregor et al.

(10) Patent No.: US 8,336,822 B2
(45) Date of Patent: Dec. 25, 2012

(54) APPARATUS FOR PROVIDING VARIABLE THERMAL INSULATION FOR AN AIRCRAFT

(75) Inventors: Keith MacGregor, Bristol (GB); Christopher Lynas, Bristol (GB)

(73) Assignee: Airbus Operations Limited, Bristol (GB)

( * ) Notice: Subject to any disclaimer, the term of this patent is extended or adjusted under 35 U.S.C. 154(b) by 872 days.

(21) Appl. No.: 12/481,208

(22) Filed: Jun. 9, 2009

(65) Prior Publication Data

US 2009/0308975 A1  Dec. 17, 2009

(30) Foreign Application Priority Data

Jun. 11, 2008 (GB) .................................. 0810670.0

(51) Int. Cl.
*B64C 1/40* (2006.01)
*F28F 13/00* (2006.01)
*B64G 1/58* (2006.01)

(52) U.S. Cl. .................. 244/119; 244/171.7; 244/171.8; 165/96; 165/135

(58) Field of Classification Search .................. 244/119, 244/121, 129.2, 133, 171.7, 171.8; 165/96, 165/135; 52/407.3, 2.11, 2.22, 406.2, 406.3, 52/407.5, 742.1; 428/69
See application file for complete search history.

(56) References Cited

U.S. PATENT DOCUMENTS

| | | | |
|---|---|---|---|
| 3,607,591 A | | 9/1971 | Hansen |
| 4,306,387 A | * | 12/1981 | Hopkins et al. ...................... 52/1 |
| 4,399,645 A | * | 8/1983 | Murphy et al. ............ 52/742.13 |
| 4,533,583 A | * | 8/1985 | May ................................. 428/69 |
| 4,547,906 A | | 10/1985 | Nishida et al. |
| 5,014,481 A | * | 5/1991 | Moe ............................... 52/406.3 |
| 5,169,700 A | * | 12/1992 | Meier et al. ...................... 428/74 |
| 5,270,092 A | * | 12/1993 | Griffith et al. .................. 428/69 |
| 5,318,108 A | * | 6/1994 | Benson et al. .................. 165/96 |
| 5,322,114 A | * | 6/1994 | Grabner ........................ 165/276 |
| 5,626,936 A | * | 5/1997 | Alderman ...................... 428/68 |
| 5,770,295 A | * | 6/1998 | Alderman ...................... 428/68 |
| 5,788,184 A | * | 8/1998 | Eddy ............................. 244/121 |
| 5,918,436 A | * | 7/1999 | Alderman .................... 52/407.3 |
| 7,968,160 B2 | * | 6/2011 | Yeganeh ...................... 428/34.1 |
| 2003/0061776 A1 | | 4/2003 | Alderman |
| 2003/0131967 A1 | | 7/2003 | Weder |
| 2004/0000113 A1 | * | 1/2004 | Alderman ..................... 52/407.5 |
| 2004/0031207 A1 | * | 2/2004 | Fleming ......................... 52/2.11 |
| 2004/0074151 A1 | * | 4/2004 | Morris ............................. 52/2.22 |
| 2007/0267545 A1 | * | 11/2007 | Orr ................................. 244/133 |

FOREIGN PATENT DOCUMENTS

WO    98/31537 A2    7/1998

OTHER PUBLICATIONS

GB Search Report for GB0810670.0 dated Oct. 10, 2008.

* cited by examiner

*Primary Examiner* — Joseph W Sanderson

(74) *Attorney, Agent, or Firm* — Lowe Hauptman Ham & Berner, LLP

(57) ABSTRACT

An aircraft insulation apparatus is disclosed having a variable thermal insulating member adjacent the inner fuselage wall and adjacent an aircraft heat source. The variable thermal insulating member is operable to provide variable thermal insulation between the heat source and the exterior of the inner fuselage wall by being changeable between a first state and a second state, the first state providing a first level of thermal insulation and the second state providing a second level of thermal insulation.

15 Claims, 5 Drawing Sheets

APPARATUS FOR PROVIDING VARIABLE THERMAL INSULATION FOR AN AIRCRAFT

RELATED APPLICATIONS

The present application is based on, and claims priority from, British Application Number 0810670, filed Jun. 11, 2008, the disclosure of which is hereby incorporated by reference herein in its entirety.

FIELD OF INVENTION

The present invention relates to apparatus for providing variable thermal insulation for an aircraft.

BACKGROUND OF THE INVENTION

Aircraft operate in a large range of environments both on the ground and in-flight. The environment within the fuselage of the aircraft, in the form of the passenger or cargo spaces, needs to be maintained within defined environmental criteria despite the prevailing conditions outside the aircraft. Most aircraft are fitted with environmental control systems arranged to maintain the required internal environmental conditions by heating, cooling and controlling the humidity of the internal aircraft environment. Such environmental control systems need to be able to cope with extreme external temperatures that may be encountered both in-flight and on the ground. In addition, internal heat sources in the form of the aircraft's systems and occupants also contribute to the load on such environmental control systems. One problem with such environmental control systems is that they consume a significant amount of power in order to operate. On the ground, this power may be provided by ground systems while in-flight any power must be generated from onboard generators or the aircraft engines.

SUMMARY OF THE INVENTION

An embodiment of the invention provides an aircraft comprising:
a fuselage comprising a fuselage wall providing an internal fuselage space;
one or more heat sources located within the internal fuselage space;
a set of first insulating members provided adjacent the fuselage wall for providing thermal insulation between the internal fuselage space and the exterior of the fuselage wall;
a set of second insulating members provided adjacent the fuselage wall and adjacent one or more of the heat sources, the second insulating members being operable to provide variable thermal insulation between the internal fuselage space and the exterior of the fuselage wall by being changeable between a first state and a second state, the first state providing a first level of thermal insulation and the second state providing a second level of thermal insulation;
control means arranged to automatically operate the set of second insulating members so as to control the thermal insulation provided for the internal fuselage space.

The control means may be further operable to maintain the insulating member at one or more intermediate steps between the first and second states so as to provide one or more corresponding levels of thermal insulation. The control means may be arranged to operate the set of second insulating members in accordance with a temperature differential based on the current temperature for the internal fuselage space, the required temperature for the internal fuselage space and the exterior measured temperature for the exterior of the fuselage. A plurality of the second insulation members may be provided and one or more of the second insulation members arranged to be independently operable of the remaining second insulation members.

The control means may be operable to monitor the internal fuselage space and the internal pressure of the set of second insulation members and to manage inflation of the second insulation members so as to maintain a required level of insulation for the internal fuselage space. The control means may be operable to permit changes in inflation levels of the second insulation members caused by changes in the internal pressure in the internal fuselage space so that the level of insulation provided by the second insulation members varies automatically in accordance with the altitude of the aircraft.

One or more of the second insulation members may comprise a self-deflating insulating material. The second insulation members comprising the self-deflating insulating material may be arranged to deflate to predetermined volume when open to ambient pressure. One or more of the second insulation members may further comprise pressure release means arranged to release pressure from the second insulation member in response to rapid decompression of the fuselage so as to avoid explosive rupture of the second insulation member. The pressure release means may comprise a pressure release valve. The pressure release means may comprise a rip point.

The control means may operate an actuator member adjacent each the second insulation member, the actuator member being operable to mechanically modify the level of insulation provided by the second insulation member. The control means may be provided at least partially by the actuating member, and the actuator is arranged to modify the level of insulation provided by the second insulation member at least partially automatically in response to a change in altitude of the aircraft. The actuator may comprise a closed volume arranged to expand or contract in response to changes in internal aircraft pressure so as to modify the level of insulation provided by the second insulation member. The control means may be provided at least partially by the aircraft cabin environmental control system.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
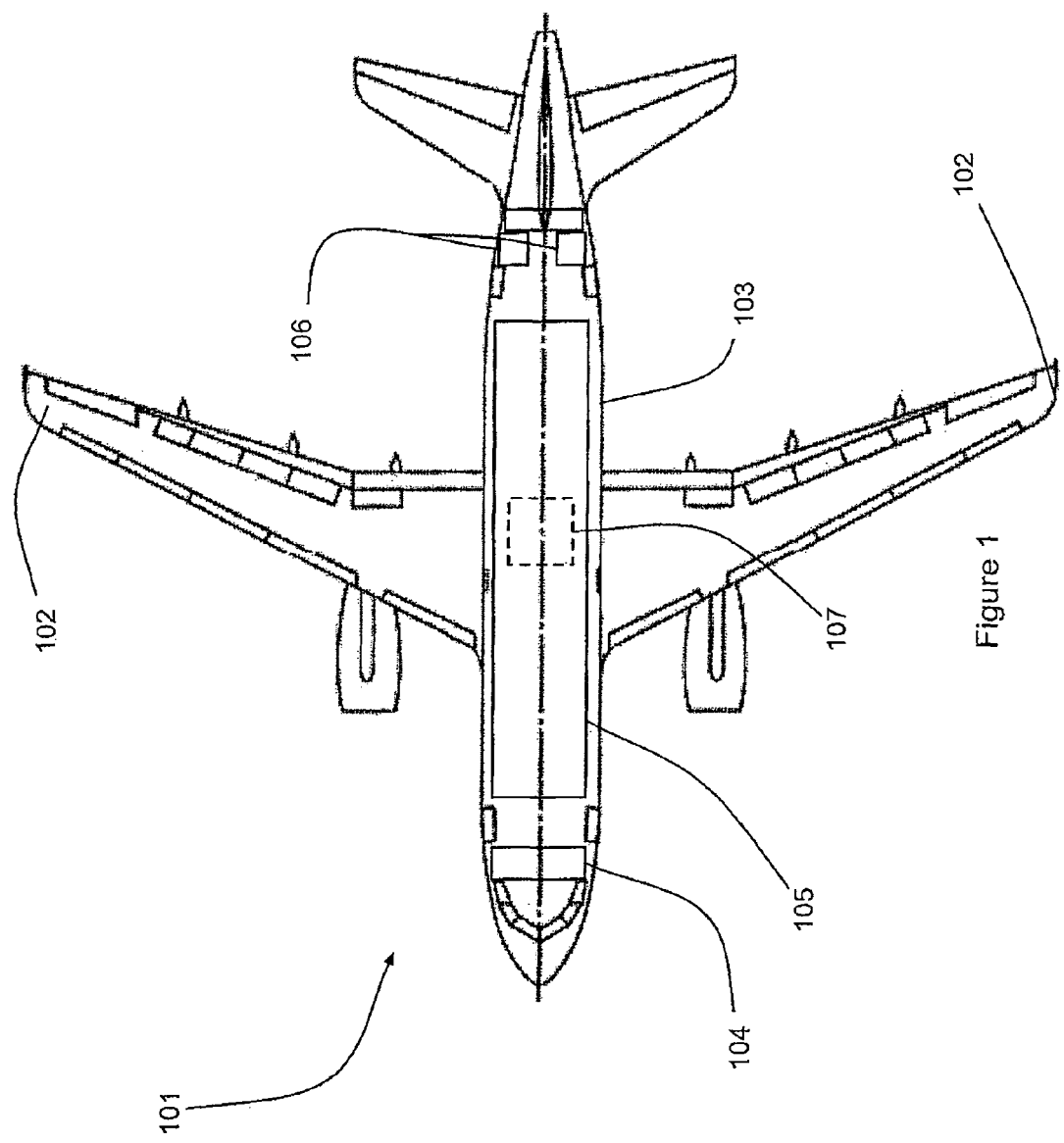
FIG. 1 is a schematic illustration in plan view of an aircraft.

With reference to FIG. 1, an aircraft 101 comprises a set of wings 102 faired into a fuselage 103. Aircraft systems are located within the fuselage 103 in the form of avionics systems 104, in-flight entertainment (IFE) systems 105 and catering systems 106. The functioning of the aircraft systems 104, 105, 106 produces heat which may tend to increase the temperature in the interior of the fuselage 103. In addition, the temperature differential between the interior and exterior of the aircraft 101, wind chill and solar radiation and may also have an effect on the temperature of the interior of the fuselage 103. The aircraft 101 may operate on the ground in large range of exterior temperatures and may operate in flight in very cold exterior temperatures. An environmental control system 107 is located in a non-pressurised section of the fuselage 103 arranged to maintain the temperature of the interior of the fuselage within a predetermined range in all operating conditions. Although the environmental control system 107 is a source of heat it does not significantly contribute towards heating the aircraft cabin due to its location.

Figure 2:
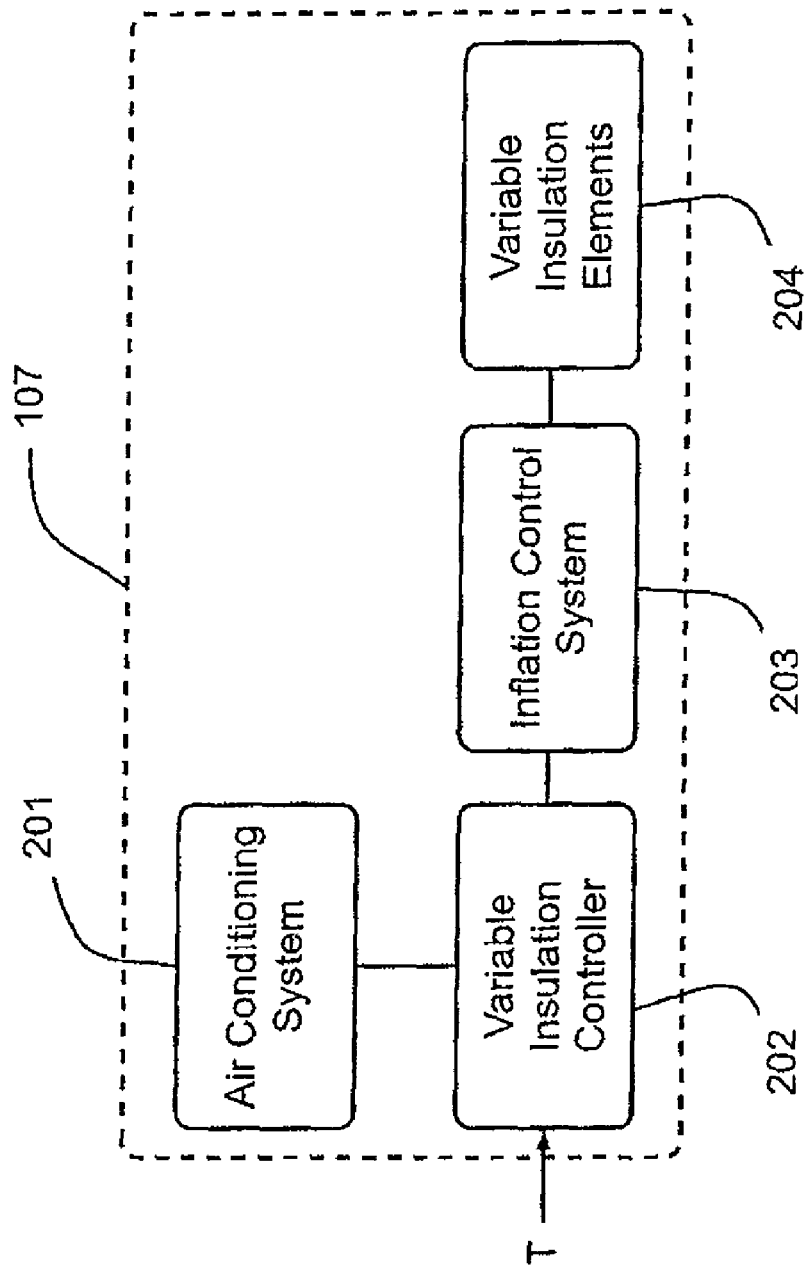
FIG. 2 is a schematic illustration of a control system for the insulating member of FIG. 1.

With reference to FIG. 2, the environmental control system 107 comprises an air conditioning system 201, a variable insulation controller 202, an inflation control system 203 and a set of variable insulation elements 204 located in the wall of the fuselage 103. The variable insulation elements 204 are arranged so that the level of insulation they provide can be varied by inflation and deflation of the elements 204 as described in further detail below. The variable insulation controller 202 is arranged to receive input signals from the air conditioning system 201 in the form of a temperature differential between the measured temperature and the required temperature for a given control zone within the fuselage 103. The variable insulation controller 202 is also provided with an indication of the exterior fuselage temperature (T). From these inputs, the variable insulation controller 202 is arranged to determine whether to reduce or increase the level of thermal insulation of the fuselage 103 and to instruct the inflation control system 203 accordingly. Individual or subsets of the variable insulation elements 204 are located so as to correspond to the control zones for the air conditioning system 201.

In response to instructions from the variable insulation controller 202 the inflation control system 203 is arranged to perform the appropriate inflation or deflation of the set of variable insulation elements 204. The inflation control system 203 also ensures that the set of variable insulation elements 204 are operated within their operational limits. In the present embodiment, the inflation control system 203 is arranged to maintain the variable insulation elements 204 in one of three states, that is, fully deflated or a minimum insulation state, half inflated or a moderate insulation state and fully inflated or a maximum insulation state. These states are described in further detail with reference to FIGS. 4a to 4c. If the inflation control system 203 receives an instruction to reduce or increase insulation and the relevant variable insulation element 204 is respectively in its minimum or maximum insulation state, the inflation control system 203 is arranged to ignore the instruction.

Thus, if the air conditioning system 201 is attempting to cool the interior of the fuselage 103 in a given zone and the exterior fuselage temperature indicates a colder exterior environment, then the variable insulation controller 202 is arranged to reduce the amount of thermal insulation for the fuselage 103 in the given zone. If however the exterior environment is indicated as warmer, the variable insulation controller 202 is arranged to increase the amount of thermal insulation for the fuselage 103 in the given zone. Converse modifications to the insulation of the fuselage 103 are made if the air conditioning system is attempting to heat a given zone of the fuselage 103.

Figure 3:
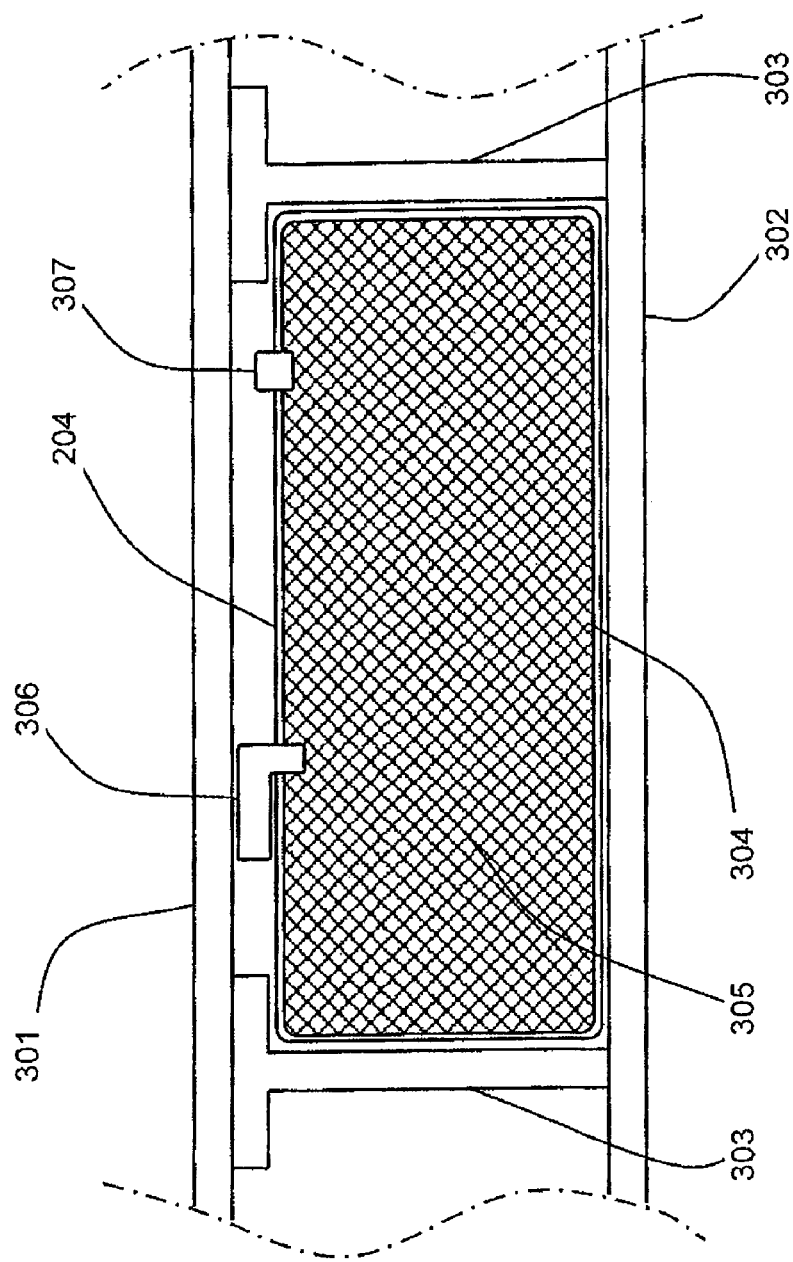
FIG. 3 is a cross sectional plan view of an insulating member for use in the aircraft of FIG. 1.

With reference to FIG. 3, each variable insulation element 204 is located within the wall of the fuselage 103 between the outer wall 301, inner wall 302 and the fuselage frame elements 303. Each variable insulation element 204 comprises a flexible outer casing 304, which provides a fluid-tight interior volume, which is filled with an insulating material 305. In the present embodiment, the insulating material 305 comprises a partially self-inflating open celled insulating material for which the thermal insulation provided is dependent on the loft of the material. In other words, the insulation provided is dependent on the amount of fluid present within the matrix of the material. Thus increasing the amount of fluid within the matrix increases the thermal insulation provided by the material. In the present embodiment, the fluid is air and the insulating material is arranged to self-inflate or deflate so as to occupy approximately half of the maximum operational volume of the casing 304.

The variable insulation element 204 also comprises an air input and output port 306 connected by a supply control line to the inflation control system 203 and a pressure relief valve 307. Since the flexible outer casing 304 provides a fluid-tight interior volume, the inflation control system 203 is able to inflate or deflate the variable insulation element 204 by pumping air in or out of the insulating material 305 via the port 306. In addition, by opening the flexible outer casing 304 to the surrounding atmosphere of the interior of the fuselage 103, the self-inflating insulating material will automatically bring the variable insulation element 204 to a half inflated state providing a moderate level of insulation. Thus the inflation control system 203, under the control of the variable insulation controller 202 is arranged to modify the thermal insulation provided by the variable insulation element 204 to the fuselage 103. The pressure relief valve is arranged to relieve pressure within the variable insulation element 204 if it exceeds a predetermined safe working pressure so as to avoid rupture of the flexible outer casing 304.

Figure 4A:
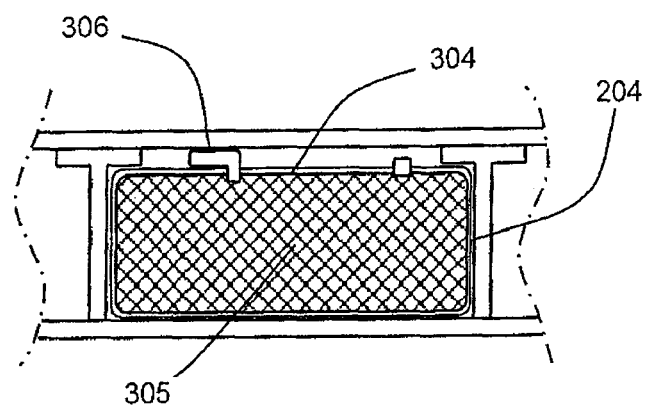
FIGS. 4a, 4b and 4c are a set of cross sectional plan views illustrating the operation of the insulating member of FIG. 3.
Figure 4B:
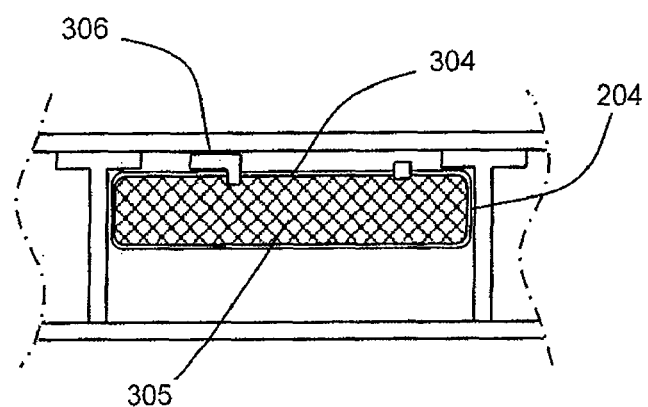
Figure 4C:
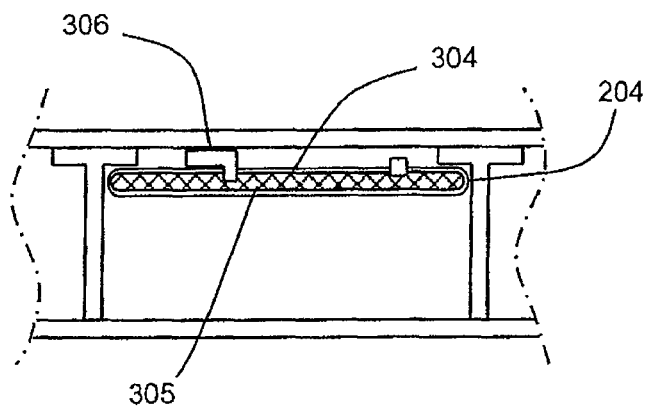

FIGS. 4a, 4b and 4c illustrate the operation of the variable insulation element 204. In FIG. 4a, the variable insulation element 204 is shown in its fully inflated state with the insulating material 305 having its fullest available loft and thus the variable insulation element 204 providing its maximum thermal insulation for the fuselage 103. The inflation control system 203 achieves and detects this fully inflated state by supplying air to the relevant variable insulation element 204 until the supply line pressure exceeds a predetermined first threshold. The first threshold is determined to as to ensure that the variable insulation element 204 is fully inflated but at a pressure within its operational limit.

In FIG. 4b, the variable insulation element 204 is in its half inflated state where a part of the air within the matrix of the insulating material 305 has been removed by the inflation control system 203 via the port 306 so as to reduce its loft and thus reduce the thermal insulation provided for the fuselage 103. As noted above, the insulation control system 203 can move the insulation element 204 to its half inflated state by opening the body member 304 to the ambient internal pressure and thus enable the insulating material to self-inflate or deflate to its equilibrium volume.

In FIG. 4c, the variable insulation element 204 is shown in its fully deflated state with the insulating material 305 having its least available loft and thus the variable insulation element 204 providing its minimum thermal insulation for the fuselage 103. The inflation control system 203 achieves and detects this fully deflated state by removing air from the relevant variable insulation element 204 until the supply line pressure falls below a predetermined second threshold. The second threshold is determined to as to ensure that the variable insulation element 204 is fully deflated but remains within its operational limits. The deflation cycle is reverse of the inflation cycle shown in FIGS. 4a to 4c.

Figure 5:
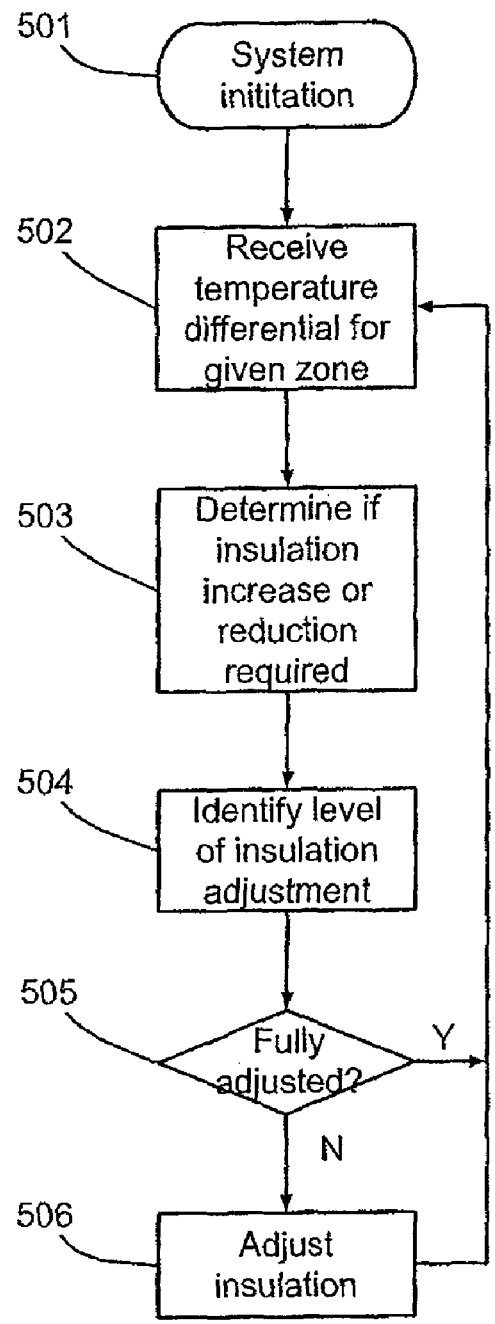
FIG. 5 is a flow chart illustrating the processing performed in the control system of FIG. 2.

The processing performed by the variable insulation controller 202 in response to inputs from the air conditioning system 201 and the exterior temperature input (T) will now be described in further detail with reference to the flow chart of FIG. 5. At step 501 processing is initiated in response to the initialisation of the air conditioning system 201 and processing moves to step 502. At step 502, processing awaits the receipt of a temperature differential from the air conditioning system 201. The temperature differential indicates the current difference between the measured temperature for a defined zone of the interior of the fuselage 103 and the required temperature for the given zone. In response to the receipt of a temperature differential, processing moves to step 503. At step 503, processing determines whether the level of insulation in the identified zone needs to be increased or reduced and by what degree based on the exterior measured temperature (T) for the exterior of the fuselage 103 and the received temperature differential. The degree of change of insulation is dependent on the size of the received temperature differential. Processing then moves to step 505 where the current state of the variable insulation elements 204 for the relevant zone of the fuselage is identified. If at step 505 the relevant variable insulation elements 204 are identified as being further adjustable then processing moves to step 506 where the calculated adjustment to the inflation level is made to the relevant variable insulation elements 204 via the inflation control system 203. Processing then returns to step 502 to await further instructions from the air conditioning system 201. If at step 505 the relevant variable insulation elements 204 are identified as being fully adjusted then processing returns straight to step 502 without any further adjustment being attempted. In other words, if the relevant variable insulation elements 204 are fully inflated or deflated, no further adjustment command is provided to the inflation control system 203.

In another embodiment, the control means is operable to maintain the insulating member at further intermediate steps between the fully inflated and deflated states so as to provide further levels of thermal insulation.

In a further embodiment, the body member of one or more of the variable insulation elements is open to the internal fuselage atmosphere and is actuated, that is inflated or deflated, by an adjacent actuating means in the form of a controllable bellow. Inflating the bellow deflates the body member thus reducing the insulation provided by the variable insulation element. Similarly, deflating the bellow inflates the body member thus increasing the insulation provided by the variable insulation element. In another embodiment the actuating means is mechanical, electromechanical or hydraulic or any combination thereof. The bellow may comprise a self-inflating or self-deflating material.

In a further embodiment, one or more variable insulating elements are provided for an aircraft and are all controlled to provide the same level of insulation. In another embodiment, a fluid other than air is used to inflate one or more of the variable insulating members. For example, the fluid may be another gas or mix of gasses or a liquid. The fluid may have fire retardant properties or may itself contribute to the insulating properties of the variable insulating elements.

In a further embodiment, the insulating member comprises a self-inflating insulating material or self-deflating insulating material arranged to partially or fully inflate or deflate the variable insulating element. The body member or bellow may be formed from, or integrally formed with, the self-inflating/deflating material. In another embodiment, the insulating material is arranged to provide negligible assistance for inflation or deflation.

As will be understood by those skilled in the art, in a typical passenger aircraft, the fuselage internal pressure varies with altitude, typically being nominal ground pressure whilst on the ground to being at an equivalent of 8,000 feet altitude when at cruise altitudes of greater than 30,000 feet. Thus, during normal operation as the aircraft climbs to altitude and the cabin air pressure falls, a sealed variable insulation elements will naturally tend to inflate. Conversely, as the aircraft looses altitude and the cabin air pressure rises and the variable insulation elements will naturally tend to deflate. The degree of inflation or deflation will be determined by the current state of the variable insulation elements as the cabin pressure falls and the physical configuration of the variable insulation elements. In some embodiments, such pressure change related inflation or deflation may not be significant and therefore not require management. In another embodiment, the variable insulation control system is arranged to monitor the internal fuselage pressure or the internal pressure of the variable insulation members and to manage their inflation so as to maintain the required levels of insulation as the cabin air pressure varies.

In a further embodiment, the actuator comprises a closed volume arranged to expand or contract in response to changes in internal aircraft pressure so as to modify the level of insulation provided by said insulating member. The actuator is thereby arranged to modify the level of insulation provided by the insulating member at least partially automatically in response to a change in altitude of the aircraft. Thus the control means may be provided at least partially by the actuating member.

In another embodiment, the flexible outer casing of the variable insulation members is provided with a casing tear device, such as a rip line, arranged to allow the variable insulation element to deflate safely so as to avoid bursting explosively in case of rapid depressurisation of the fuselage. The casing tear device may be provided instead of or in addition to the pressure relief valve.

As will be understood by those skilled in the art, while the variable inflation controller and the inflation control system are described above as separate systems, they may be integrated with the environmental control or other systems of the aircraft. As will be understood by those skilled in the art, while the above embodiments are described applied to aircraft, the variable insulation system may be applied to other vehicles such as spacecraft. Furthermore, embodiments may be applied to other suitable vehicles or to any other arrangement where variable insulation is required.

As will be understood by those skilled in the art, detecting or measuring the inflation level of a variable insulating element may be performed by a number of alternative mechanisms. For example, detectors may be placed in or around the variable insulating element to detect pressure or position of the variable insulating element. Furthermore, a request to modify the level of insulation when the variable insulating element is already fully adjusted in the requested direction may result in an error message being sent to the variable insulation controller or to the air conditioning system.

In another embodiment, the body member is integrally biased into either the deflated or inflated position so as to at least partially actuate the change in state of the variable insulating element. In a further embodiment, the variable insulating elements are used in combination with acoustic insulation or a noise cancelling system. In another embodiment, the variable insulating elements are arranged to have a failsafe mode in which the variable insulating elements return to a predetermined state. The failsafe state may be maximum or minimum insulating modes or and intermediate state depending on the application. In a further embodiment, the variable insulating elements are located only at specific locations within the aircraft such as adjacent heat sources such as galley, avionics or other on-board systems.

As will be understood by those in the art, the aircraft plan view shown in FIG. 1 is a typical aircraft, but this is not the only possible configuration. Embodiments of the invention may be applied to any other suitable aircraft configuration. While in the embodiments described above, the location of the various systems are specified, those skilled in the art will understand that these locations are not fixed and may be varied.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. An aircraft comprising:
a fuselage comprising an inner fuselage wall bounding an internal fuselage space;
an aircraft system comprising a heat source adjacent said inner fuselage wall and located within said internal fuselage space;
an insulating member provided adjacent said inner fuselage wall and adjacent said aircraft system, said insulating member being operable to provide variable thermal insulation between said aircraft system and the exterior of said fuselage by being changeable between a first state and a second state, said first state providing a first level of thermal insulation and said second state providing a second level of thermal insulation; and
a controller operable to automatically control the level of insulation provided by said insulating member.

2. An aircraft according to claim 1 in which said controller is further operable to maintain said insulating member at one or more intermediate steps between said first and second states so as to provide one or more corresponding further levels of thermal insulation.

3. An aircraft according to claim 1 in which said controller is arranged to operate said insulating member in accordance with a temperature differential based on the current temperature for said internal fuselage space, the required temperature for said internal fuselage space and the exterior measured temperature for the exterior of said fuselage.

4. An aircraft according to claim 1 in which a plurality of said insulation members are provided and one or more of said insulation members is arranged to be independently operable of the remaining insulation members.

5. An aircraft according to claim 1 in which said controller is operable to monitor the internal fuselage space and the internal pressure of said insulation members and to manage inflation of said insulation member so as to maintain a required level of insulation for said internal fuselage space.

6. An aircraft according to claim 1 in which said controller is operable to permit changes in inflation levels of said insulation member caused by changes in the internal pressure in said internal fuselage space so that the level of insulation provided by said insulation member varies automatically in accordance with the altitude of said aircraft.

7. An aircraft according to claim 6 in which said insulation member comprising said self-deflating insulating material is arranged to deflate to predetermined volume when open to ambient pressure.

8. An aircraft according to claim 7 in which said pressure release means comprises a pressure release valve.

9. An aircraft according to claim 7 in which said pressure release means comprises a rip point.

10. An aircraft according to claim 9 in which said controller is provided at least partially by said actuating member, and said actuator is arranged to modify said level of insulation provided by said insulation member at least partially automatically in response to a change in altitude of said aircraft.

11. An aircraft according to claim 9 in which said aircraft comprises a closed volume arranged to expand or contract in response to changes in internal aircraft pressure so as to modify the level of insulation provided by said insulation member.

12. An aircraft according to claim 1 in which said insulation member comprises a self-deflating insulating material.

13. An aircraft according to claim 1 in which said insulation member further comprises pressure release means arranged to release pressure from said insulation member in response to rapid decompression of said fuselage so as to avoid explosive rupture of said insulation member.

14. An aircraft according to claim 1 in which said controller operates an actuator member adjacent said insulation member, said actuator member being operable to mechanically modify the level of insulation provided by said insulation member.

15. An aircraft according to claim 1 in which said controller is provided at least partially by the aircraft cabin environmental control system.

* * * * *